No. 817,953. PATENTED APR. 17, 1906.
R. H. BLACKALL.
FLUID PRESSURE BRAKE.
APPLICATION FILED JUNE 13, 1903.
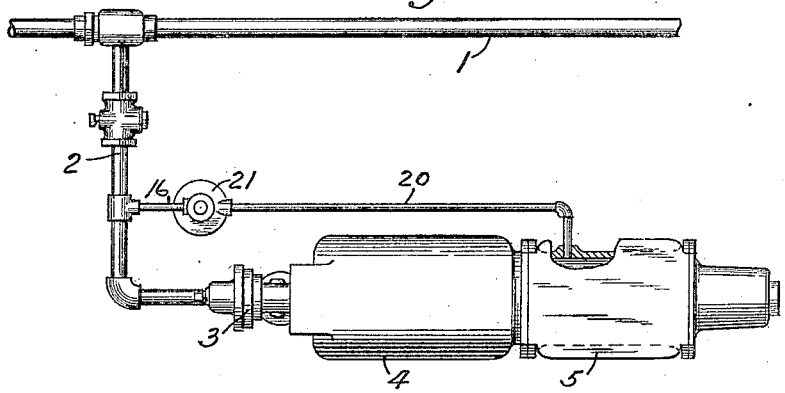
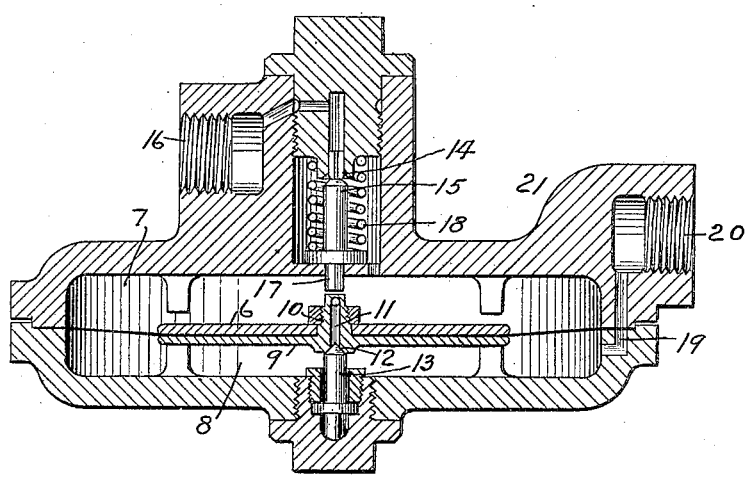
WITNESSES:
J. Custer
Jas. B. MacDonald
INVENTOR,
Robert H. Blackall
By E. Wright
Att'y.

UNITED STATES PATENT OFFICE.

ROBERT H. BLACKALL, OF EDGEWOOD PARK, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 817,953.      Specification of Letters Patent.      Patented April 17, 1906.

Application filed June 13, 1903. Serial No. 161,296.

*To all whom it may concern:*

Be it known that I, ROBERT H. BLACKALL, a citizen of the United States, residing in Edgewood Park, county of Allegheny, State of Pennsylvania, have invented a certain new and useful Improvement in Fluid-Pressure Brakes, of which improvement the following is a specification.

This invention relates to fluid-pressure brakes, and especially to that type of brakes known as the "quick-action automatic," in which there is a local venting of the train-pipe upon each car in emergency applications.

In the fluid-pressure brake apparatus of this character as now used the equalized pressure of the brake-cylinder and auxiliary reservoir in an emergency application is somewhat greater than the pressure remaining in the train-pipe owing to the previous local venting of the train-pipe to the brake-cylinder or elsewhere, so that some difficulty has been experienced in securing a quick release of the brakes after an emergency application, since a greater excess of main-reservoir pressure is required to restore the train-pipe pressure and to raise the same sufficiently above that of the auxiliary reservoir to cause the movement of the triple valves to release position. It sometimes happens that a considerable period of time is required to release the brakes after an emergency application, especially in case the main-reservoir pressure has been somewhat depleted, owing to the fact that there is not sufficient excess pressure in the main reservoir to immediately raise the lower train-pipe pressure to that of the auxiliary reservoir. This delay or inability to quickly release the brakes after an emergency application has in some cases been found to be a very objectionable feature; and the main object of my invention is to provide an improved means for securing an equalization of the pressures in the train-pipe and in the auxiliary reservoir and brake-cylinder immediately after an emergency application of the brakes, so that the brakes may be quickly released by substantially the same amount of excess of main-reservoir pressure as is required in the release after ordinary service applications. My improved valve device is also designed to prevent any backflow from the auxiliary reservoir and brake-cylinder to the train-pipe in case the emergency application of the brakes is caused by the bursting of a hose or other accident where all the train-pipe pressure escapes to the atmosphere.

In the accompanying drawings, Figure 1 is a plan view of an automatic fluid-pressure brake equipment for a car, showing my improvement applied thereto; and Fig. 2 is a central sectional view showing one form of my improved valve device upon a larger scale.

According to the construction as herewith illustrated the train-pipe 1 is provided with the branch pipe 2, having the usual connections with the triple valve 3, auxiliary reservoir 4, and brake-cylinder 5. My improved equalizing valve device is designed to be connected up to the train-pipe and to the brake-cylinder and, as shown in Fig. 2, comprises a casing 21, constructed in two parts, between which is clamped the movable abutment or diaphragm 6, forming upper and lower chambers 7 and 8. A plate 9, having a boss 10, is secured to the diaphragm, and a port 11 is formed in the boss for establishing communication between the chambers on opposite sides of the diaphragm, the lower end of the port forming a valve-seat 12 for engaging the valve 13 and closing said port when the parts are in the normal position and the train-pipe pressure exceeds that of the brake-cylinder. The chamber 7 above the diaphragm communicates with the train-pipe through port 14 and pipe 16, the port 14 being controlled by valve 15, the stem 17 of which extends to a point near the boss 10 of the diaphragm. A spring 18 normally holds the valve 15 open. The lower chamber 8 is in constant open communication with the brake-cylinder through port 19 and pipe connection 20.

The operation of my improved device is as follows: When an emergency application of the brakes is made and the equalized pressure of the auxiliary reservoir and brake-cylinder is higher than that remaining in the train-pipe, this higher pressure acts upon the under side of diaphragm 6 in chamber 8 against the lower train-pipe pressure which obtains in chamber 7 on the upper side of the diaphragm and moves the diaphragm up until the boss 10 engages the stem 17, the spring 18 preventing further movement.

This movement is sufficient to raise the seat 12 from the valve 13 and open port 11, thereby establishing communication from the brake-cylinder to the train-pipe and allowing the higher pressure of the brake-cylinder and auxiliary reservoir to equalize back into the train-pipe, thus gradually raising the train-pipe pressure to be substantially equal to that of the auxiliary reservoir. Then when it is desired to release the brakes only the usual amount of excess pressure from the main reservoir is required to be charged into the train-pipe in order to cause the triple valves to move to release position. As soon as the auxiliary-reservoir and brake-cylinder pressure have equalized with that of the train-pipe through port 11 the diaphragm returns to its normal position, with valve 13 closed upon its seat, so that there is no danger of leakage from the train-pipe through port 11 when the train-pipe pressure is increased. When an emergency application of the brakes is occasioned by the bursting of a hose or other accident, causing an entire venting of the train-pipe to the atmosphere, the pressure in chamber 7 above the diaphragm also diminishes to atmospheric pressure, and the greater pressure of the brake-cylinder on the opposite side of the diaphragm immediately forces the same to the opposite extreme position, compressing the spring 18 and closing the valve 15, thus preventing the escape of the compressed air from the brake-cylinder to the open train-pipe through ports 11 and 14 and holding the brakes applied.

The efficiency of the emergency application of the brakes will not be in any way impaired by the use of my improvement, since, owing to the small size of the port 11 and the slight opening of the valve 13, the pressure which obtains in the brake-cylinder in an emergency application will not be materially reduced by the backflow to the train-pipe until after a sufficient period of time has elapsed to diminish the speed of the car to such an extent that the excessive brake-cylinder pressure has served its purpose and is no longer required.

It will now be seen that by the use of my improvement the release of the brakes after an emergency application will be greatly facilitated, while at the same time in case of an emergency application, due to a bursted hose or complete venting of the train-pipe to the atmosphere, the pressure is retained in the brake-cylinder.

While I have described one specific form of valve device involving my invention, it will be understood that the same is not limited to this construction, since various other devices within the scope of my invention may be designed for the same purpose.

Having now described my invention, what I claim as new, and desire to secure by Letters Patent, is—

1. In a fluid-pressure brake, the combination with a train-pipe, auxiliary reservoir, brake-cylinder, and a triple-valve device having means for supplying air from the train-pipe and from the auxiliary reservoir to the brake-cylinder in emergency applications, of means independent of the triple-valve piston for slowly equalizing the pressures upon opposite sides thereof after an ordinary emergency application of the brakes.

2. In a fluid-pressure brake, the combination with a train-pipe, auxiliary reservoir, brake-cylinder, and a triple-valve device having means for supplying air from the train-pipe and from the auxiliary reservoir to the brake-cylinder in emergency applications, of means independent of the triple-valve piston for slowly equalizing the pressures upon opposite sides thereof after an ordinary emergency application of the brakes, and for preventing such equalization upon excessive venting of the train-pipe.

3. In a fluid-pressure brake, the combination with a train-pipe, auxiliary reservoir, brake-cylinder and quick-action triple valve, of a valve device for opening communication from the brake-cylinder to the train-pipe in an ordinary emergency application and for closing such communication upon an excessive venting of the train-pipe.

4. In a fluid-pressure brake, the combination with a train-pipe, auxiliary reservoir, brake-cylinder and quick-action triple valve, of a valve device actuated by the usual venting of the train-pipe in emergency applications to open communication from the brake-cylinder to the train-pipe and actuated by an excessive or complete venting of the train-pipe to close such communication.

5. In a fluid-pressure brake, the combination with a train-pipe, auxiliary reservoir, brake-cylinder and quick-action triple valve, of a valve for controlling communication from the brake-cylinder to the train-pipe, and a movable abutment subjected to the opposing pressures from the train-pipe and from the brake-cylinder for operating said valve.

6. In a fluid-pressure brake, the combination with a train-pipe, auxiliary reservoir, brake-cylinder and quick-action triple valve, of a valve device for controlling communication from the brake-cylinder to the train-pipe, a movable abutment subject to opposing pressures from the brake-cylinder and the train-pipe and actuated by a small excess of brake-cylinder pressure to open said communication and by a great excess of brake-cylinder pressure to close said communication.

7. An equalizing valve device for fluid-pressure brakes, comprising a movable abutment exposed on one side to train-pipe pressure and on the opposite side to brake-cylinder pressure, and means actuated by a slight movement of the abutment to open communication from the brake-cylinder to the train-pipe and by a further movement in the same direction to close such communication.

8. An equalizing valve device for fluid-pressure brakes, comprising a valve for controlling communication from the brake-cylinder to the train-pipe, and a movable abutment subject to the opposing pressures of the train-pipe and brake-cylinder for operating said valve.

9. An equalizing valve device for fluid-pressure brakes, comprising valves for controlling communication from the brake-cylinder to the train-pipe, a movable abutment subject to opposing pressures of the train-pipe and brake-cylinder, means actuated by a small movement of the abutment to open one of said valves and means actuated by a further movement of the abutment in the same direction to close another of said valves.

10. An equalizing valve device for fluid-pressure brakes, comprising a casing having a movable abutment therein subject to the opposing pressures of the train-pipe and brake-cylinder, means actuated by a small movement of the abutment for opening communication from the brake-cylinder to the train-pipe, a spring for opposing further movement of the abutment and means actuated by a further movement of the abutment for closing said communication.

In testimony whereof I have hereunto set my hand.

ROBERT H. BLACKALL.

Witnesses:
  R. F. EMERY,
  JAS. B. MACDONALD.